United States Patent
Rule et al.

(10) Patent No.: US 12,056,685 B2
(45) Date of Patent: *Aug. 6, 2024

(54) USING ON-DEMAND APPLICATIONS TO PROCESS ENCRYPTED DATA FROM A CONTACTLESS CARD

(71) Applicant: Capital One Services, LLC, McLean, VA (US)

(72) Inventors: Jeffrey Rule, Chevy Chase, MD (US); Wayne Lutz, Fort Washington, MD (US); Paul Moreton, Glen Allen, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/125,278

(22) Filed: Mar. 23, 2023

(65) Prior Publication Data

US 2023/0222485 A1 Jul. 13, 2023

Related U.S. Application Data

(63) Continuation of application No. 17/685,470, filed on Mar. 3, 2022, now Pat. No. 11,640,600, which is a
(Continued)

(51) Int. Cl.
*G06Q 20/34* (2012.01)
*G06F 16/955* (2019.01)
(Continued)

(52) U.S. Cl.
CPC ....... *G06Q 20/352* (2013.01); *G06F 16/9566* (2019.01); *G06F 21/35* (2013.01); *G06F 40/174* (2020.01); *H04W 4/80* (2018.02); *H04W 12/47* (2021.01); *G06F 21/445* (2013.01); *G06F 21/62* (2013.01); *G06Q 20/351* (2013.01); *G06Q 20/3829* (2013.01); *G06Q 20/385* (2013.01);
(Continued)

(58) Field of Classification Search
CPC ............ G06Q 20/3829; G06Q 20/352; G06Q 20/385; G06Q 20/4018; G06Q 20/409; G06Q 2220/00; G06F 16/9566; G06F 21/35; G06F 40/174; H04W 4/80
USPC .......................................................... 705/65
See application file for complete search history.

(56) References Cited

U.S. PATENT DOCUMENTS

2009/0192935 A1* 7/2009 Griffin ................. H04W 4/50
705/76
2010/0313115 A1* 12/2010 Varone ................. G06F 16/986
235/492

(Continued)

OTHER PUBLICATIONS

Arjun Kumar Bhaskar Shetty, Design and Implementation of an Open Beaconing Architecture for Internet of Things, May 2015, pp. 7, 9, 11 (Year: 2015).*

(Continued)

*Primary Examiner* — Mohammad A. Nilforoush
*Assistant Examiner* — Wodajo Getachew
(74) *Attorney, Agent, or Firm* — KDW FIRM PLLC

(57) ABSTRACT

A device may receive a uniform resource locator (URL) and encrypted data. The device may download a first application from an application server based on the URL. The device may download and execute the first application. The first application may receive the encrypted data.

20 Claims, 10 Drawing Sheets

Related U.S. Application Data continuation of application No. 16/524,712, filed on Jul. 29, 2019, now Pat. No. 11,514,431, which is a continuation of application No. 16/265,961, filed on Feb. 1, 2019, now Pat. No. 10,467,622.

(51) Int. Cl.

| | |
|---|---|
| *G06F 21/35* | (2013.01) |
| *G06F 40/174* | (2020.01) |
| *G06Q 20/38* | (2012.01) |
| *H04W 4/80* | (2018.01) |
| *H04W 12/47* | (2021.01) |
| *G06F 21/44* | (2013.01) |
| *G06F 21/62* | (2013.01) |
| *G06Q 20/40* | (2012.01) |
| *H04W 12/069* | (2021.01) |
| *H04W 12/30* | (2021.01) |

(52) U.S. Cl.
CPC ....... *G06Q 20/4018* (2013.01); *G06Q 20/409* (2013.01); *G06Q 2220/00* (2013.01); *H04W 12/069* (2021.01); *H04W 12/35* (2021.01)

(56) References Cited

U.S. PATENT DOCUMENTS

| | | | |
|---|---|---|---|
| 2012/0221474 A1* | 8/2012 | Eicher | G09C 5/00 |
| | | | 705/26.1 |
| 2012/0222129 A1* | 8/2012 | Racciopi | G06F 21/57 |
| | | | 709/217 |
| 2015/0263790 A1 | 9/2015 | Chein | |
| 2016/0026997 A1* | 1/2016 | Tsui | G06Q 20/322 |
| | | | 705/44 |
| 2019/0034547 A1* | 1/2019 | Kim | H04L 67/563 |

OTHER PUBLICATIONS

Monica C. Silio, The Effects of Word Prediction and Text-to-Speech Technologies on the Narrative Writing Skills of Students With Specific Learning Disabilities, 2008, pp. 5, 101 (Year: 2008).*

* cited by examiner

USING ON-DEMAND APPLICATIONS TO PROCESS ENCRYPTED DATA FROM A CONTACTLESS CARD

RELATED APPLICATIONS

This application is a continuation of U.S. patent application Ser. No. 17/685,470, filed Mar. 3, 2022, which is a continuation of U.S. patent application Ser. No. 16/524,712, filed Jul. 29, 2019, which is a continuation of U.S. patent application Ser. No. 16/265,961, entitled "USING ON-DEMAND APPLICATIONS TO GENERATE VIRTUAL NUMBERS FOR A CONTACTLESS CARD TO SECURELY AUTOFILL FORMS" filed on Feb. 1, 2019. The contents of the aforementioned applications are incorporated herein by reference.

TECHNICAL FIELD

Embodiments herein generally relate to computing platforms, and more specifically, to using on-demand applications to process encrypted data from a contactless card.

BACKGROUND

Account identifiers for payment cards are often long numeric and/or character strings. As such, it is difficult for a user to manually enter the account identifier correctly. Indeed, users often make mistakes and enter incorrect account numbers into computing interfaces (e.g., payment interfaces). Often, native operating system (OS) applications downloaded from application stores may include functionality to assist users in entering account identifiers into forms. However, some users may not have such applications on their devices. Therefore, these users must manually enter the account identifier correctly.

SUMMARY

Embodiments disclosed herein provide systems, methods, articles of manufacture, and computer-readable media for using on-demand applications to process encrypted data received from a contactless card. In one aspect, a method includes receiving, by a device from a contactless card, a uniform resource locator (URL) and encrypted data, downloading, by the device, a first application from an application server based on the URL, installing, by the device, the first application, executing, by the device, the first application, and receiving, by the first application, the encrypted data.

DETAILED DESCRIPTION

Figure 1A:
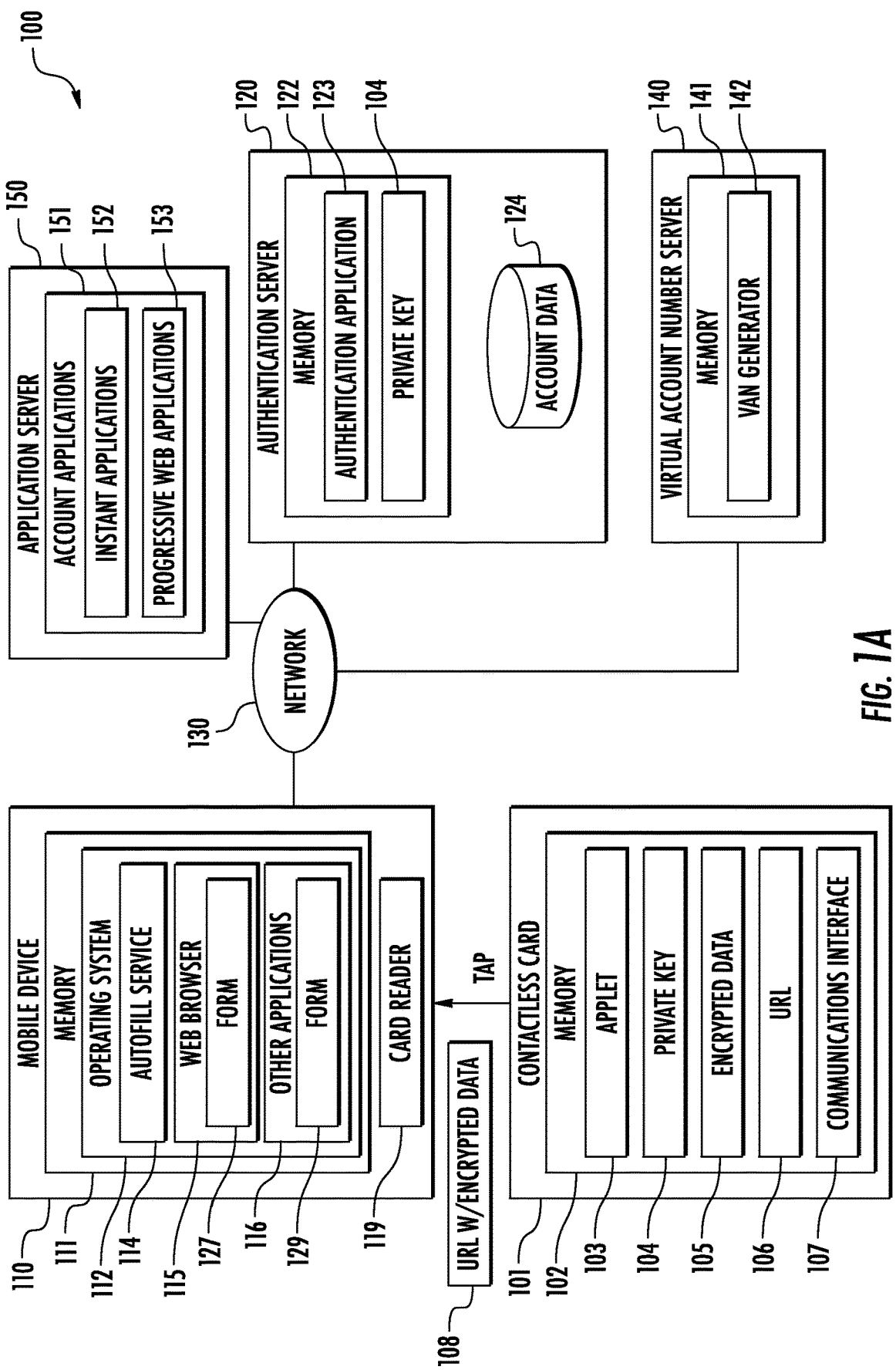
FIGS. 1A-1C illustrate embodiments of a system to tap a contactless card to a computing device to securely generate virtual card numbers which can be autofilled in form fields.

Embodiments disclosed herein provide secure techniques to use a contactless card to generate card data (e.g., an account number, expiration date, and/or card verification value (CVV)) which can be automatically filled to a form on a computing device without requiring applications (e.g., banking applications, account management applications, payment applications, etc.) to be pre-installed on the device. Generally, the contactless card may come within communications range of a computing device, e.g., via a tap gesture, when the computing device is outputting a form including card data fields. Doing so causes the contactless card to generate a uniform resource locator (URL) which is transmitted to the computing device. At least a portion of the URL may be directed to an application server hosting one or more applications and/or application segments. The applications may include applications available via application stores, while the segments of the applications may include a portion the application (e.g., one or more pages, one or more functions, etc.). For example, the application segments may be on-demand applications, such as instant applications and/or progressive web applications. One or more application segments associated with the URL may be downloaded to and executed on the computing device.

The URL generated by the contactless card may further include data used by an authentication server as part of a validation process. For example, the URL may include encrypted data that is decrypted by the server as part of the validation process. The downloaded application segments may receive the URL and extract the encrypted data. The downloaded application may then transmit the encrypted data to the authentication server for validation. Once validated, the authentication server may instruct a virtual account number server to generate card data for the account associated with the contactless card. The card data may include a virtual account number, an expiration date, a CVV, and an address of the user. A virtual account number may be an account number that is different than the account number associated with the contactless card. The generated card data may then be transmitted to the application segments executing on the computing device. The application segments may provide the card data to an autofill service of the OS. The autofill service may then automatically fill the card data may into the corresponding payment fields of the form.

Advantageously, embodiments disclosed herein improve the security of all devices and associated data. For example, embodiments disclosed herein provide the security of applications installed through application stores when autofilling card data without requiring users to install the application from the application store on their computing device. Furthermore, conventional approaches require the user to manually enter card data into a form. However, doing so may allow other users or devices to capture the card data as the user enters the card data into the form. By eliminating the need for the user to manually enter card data into the form, the security of the card data is enhanced.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, an authentication server 120, a virtual account number server 140, and an application server 150. The contactless cards 101 are representative of any type of payment cards, such as a credit card, debit card, ATM card, gift card, and the like. The contactless cards 101 may comprise one or more chips (not depicted), such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The servers 120, 140, 150 are representative of any type of computing device, such as a server, workstation, compute cluster, cloud computing platform, virtualized computing system, and the like.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes an autofill service 114, a web browser 115, and one or more other applications 116. The autofill service 114 injects data into the views of other applications (e.g., the web browser 115 and/or the other applications 116) to fill forms in the other applications. The autofill service 114 may also retrieve user data from the views in an application and store the data for later use. The autofill service 114 is used as a reference example herein and should not be considered limiting of the disclosure. The disclosure is equally applicable to other types of code that automatically fill form fields in an application and/or web page by injecting data into the form fields, such as an accessibility service. The web browser 115 is an application that allows the mobile device 110 to access information via the network 130 (e.g., via the Internet). In operation, the web browser 115 may access content that includes one or more forms 127. For example, the web browser 115 may load a bank card management page that includes one or more forms 127 with fields for card data (e.g., a name field, a card number field, an expiration date field, a CVV field, a billing address field, shipping address field, etc.). The other applications 116 are representative of any application that includes one or more forms 129 with fields for card data (e.g., a name field, a card number field, an expiration date field, a CVV field, a billing address field, shipping address field, etc.). For example, the other applications 116 include dedicated merchant applications for processing purchases, applications for services (e.g., taxi services, delivery services, etc.), and the like. Each example of the other applications 116 includes one or more forms 129 with fields for card data.

As another example, a user may make purchases from a merchant's website using the web browser 115 and/or the other application 116 provided by the merchant. To complete the transaction, the user must provide card data to one or more forms 127 in the web browser 115 and/or the forms 129 of the other application 116. The use of a web browser 115 and/or the other applications 116 as reference examples herein should not be considered limiting of the disclosure, as the disclosure is equally applicable to all types of applications that include forms with fields for card data and all types of forms with fields for card data.

Generally, a user may encounter a form 127, 129 that includes one or more fields for card data (e.g., a name field, a card number field, an expiration date field, a CVV field, a billing address field, shipping address field, etc.). Conventionally, the user is required to manually enter their name, card number, expiration date, CVV, and/or address information. Some mobile operating systems allow such data to be autofilled into forms, but other mobile operating systems impose restrictions on autofilling such data. Furthermore, in operating systems that allow the data to be autofilled in forms, the user must be authenticated through a dedicated application to do so. For example, prior solutions require the user to install an account management application provided by the issuer of the contactless card 101 and authenticate in the application to autofill card data in the forms 127, 129. Advantageously, however, embodiments disclosed herein solve such issues by leveraging the contactless card 101 to trigger the generation of a virtual account number, expiration date, and/or CVV that can be copied to the autofill service 114 of the OS 112 without requiring an application (such as the account management application) that is pre-installed on the device 110.

To do so, a user may tap the contactless card 101 to the mobile device 110, thereby bringing the contactless card 101 sufficiently close to the card reader 119 of the mobile device 110 to enable NFC data transfer between the communications interface 107 of the contactless card 101 and the card reader 119 of the mobile device 110. In some embodiments, the mobile device 110 may trigger the card reader 119 via an application program interface (API) call. In one example, the mobile device 110 triggers the card reader via an API call responsive to the user tapping or otherwise selecting an element of the user interface, such as a form field. In addition and/or alternatively, the mobile device 110 may trigger the card reader 119 based on periodically polling the card reader 119. More generally, the mobile device 110 may trigger the card reader 119 to engage in communications using any feasible method. After communication has been established between mobile device 110 and contactless card 101 the applet 103 executing on a processor (not pictured) of the contactless card 101 generates and transmits data to the mobile device 110 via the communications interface 107. In some embodiments, the data generated by the contactless card 101 may include a URL 106. The URL may be directed to the application server 150, or some other location that is hosting one or more account applications 151. When the OS 112 receives the URL 106, the OS may dynamically download an account application 151 from the URL 106, and dynamically install the account application 151 on the device. The URL 106 may further be a universal link URL (or deep link URL) that opens a local resource (e.g., one or more specific pages of the associated account applications 151). The pages of the account applications 151 that should be opened upon execution on the mobile device 110 may be specified as parameters of the URL.

More generally, the URL 106 is representative of one or more URLs (and/or uniform resource identifiers (URIs)) directed to one or more account applications 151 of the application server 150. The applet 103 may select the URL 106 based on any suitable selection technique (e.g., randomly, based on data received from the mobile device 110, etc.). The account applications 151 may include on-demand applications that can be dynamically downloaded and installed on the mobile device 110. As shown, the account applications 151 include instant applications 152 and progressive web applications 153. An instant application is a non-persistent application that may be dynamically downloaded and installed on the mobile device 110. One example of an instant application 152 is an Android® instant application. The instant application 152 is an on-demand application that may immediately be installed and executed on the mobile device 110 when the download is complete. Furthermore, instant applications 152 correspond to a subset of an application that is chosen based on a particular function to be performed, while the remainder of the application can be downloaded later (or as part of a background process). For example, the instant applications 152 may be a subset of an overall account management application that performs a variety of functions, while the instant applications 152 comprise one or more portions of the account management application and/or a subset of functions provided by the account management application.

Generally, progressive web applications are on-demand applications that execute in the web browser 115 and remain persistent when executing on the mobile device 110. For example, progressive web applications are allocated storage of the mobile device 110 and can be updated in the background when new functionality is added to the progressive web application. One example of a progressive web application 153 is an Android progressive web application. As stated, progressive web applications 153 may be dynamically downloaded and executed in the web browser 115 automatically when the download is complete. The progressive web applications 153 correspond to a subset of an application that is chosen based on a particular function to be performed. For example, the progressive web applications 153 may be a subset of an overall account management application that performs a variety of functions, while the progressive web applications 153 comprise one or more portions of the account management application and/or a subset of functions provided by the account management application.

In some embodiments, the account applications 151 include one or more portions (or segments) of another application (e.g., the account management application, etc.). Therefore, stated differently, the account applications 151 may include a subset (or all) of the pages and/or functionality of the other application. For example, a first account application 151 may include a page that allows customers to view their bank account balance and a page that allows customers to send emails to customer service while excluding other functionality provided by the complete account management application (e.g., payment scheduling, loan requests, etc.). Advantageously, the first account application 151 is able to perform the associated functions without requiring the bank's account management application to be pre-installed on the mobile device 110. More generally, the account applications 151 may collectively be considered as a cloud-based "application bundle" that can be accessed, and a subset of that bundle can be quickly downloaded to the mobile device 110. Therefore, the application bundle may collectively include all functionality provided by the account management application, but only a subset of the account applications 151 required to perform one or more needed operations are downloaded to the mobile device 110.

The URL 106 generated by the applet 103 may further include encrypted data 105 as parameters. As described in greater detail below, the encrypted data 105 may be used by the authentication server 120 to validate the data generated by the contactless card 101. For example, the applet 103 of the contactless card 101 may use a cryptographic algorithm to generate a cryptographic payload of encrypted data 105 based at least in part on the private key 104 stored in the memory 102 of the contactless card 101. In such an embodiment, the private key 104 and some other piece of data (e.g., a customer identifier, account identifier, etc.) may be provided as the input to the cryptographic algorithm, which outputs the encrypted data 105. Generally, the applet 103 may use any type of cryptographic algorithm and/or system to generate the encrypted data 105, and the use of a specific cryptographic algorithm as an example herein should not be considered limiting of the disclosure. In some embodiments, the applet 103 may perform encryption using a key diversification technique to generate the cryptographic payload. Examples of key diversification techniques are described in U.S. patent application Ser. No. 16/205,119, filed Nov. 29, 2018. The aforementioned patent application is incorporated by reference herein in its entirety.

As stated, the applet 103 of the contactless card 101 may include the encrypted data 105 as a parameter of the URL 106, thereby generating a URL with encrypted data 108. For example, if the URL to the application server 150 and/or an account application 151 is "http://www.example.com/accountapp" and the encrypted data 105 is "ABC123", the URL with encrypted data 108 may be "http://www.example.com/accountapp?data=ABC123". In some embodiments, the applet 103 may encode the encrypted data 105 according to an encoding format compatible with URLs prior to including the encrypted data 105 as a parameter of the URL 106. For example, the encrypted data 105 may be a string of binary data (e.g., zeroes and ones), which may not be compatible with URLs. Therefore, the applet 103 may encode the encrypted data 105 to the American Standard Code for Information Interchange (ASCII) base64 encoding format. Doing so represents the binary encrypted data 105 in an ASCII string format by translating it into a radix-64 representation (e.g., "ABC123" in the previous example). Further still, the URL 106 may include an indication of which page of the application 151 to open upon installation. Continuing with the previous example, a page identifier of "1" (or other page identifier, such as a page name, etc.) may be added as a parameter to the URL 106, and the URL with encrypted data 108 may be "http://www.example.com/accountapp?data=ABC123&p=1".

Once generated, the applet 103 may transmit the URL with encrypted data 108 to the mobile device 110, e.g., via NFC. In one embodiment, when received by the OS 112, the OS 112 causes the web browser 115 to access the URL with encrypted data 108. Doing so causes information describing the mobile device 110 to be sent with the request to access the URL with encrypted data 108. For example, the information may include attributes of the mobile device 110, such as operating system version, hardware capabilities, and software capabilities. In response, the application server 150 may transmit the account application 151 associated with the URL with encrypted data 108 to the mobile device 110. In some embodiments, the application server 150 selects an account application 151 based on the received attributes of the mobile device 110. For example, if the OS 112 of the mobile device 110 does not support progressive web applications 153, the application server 150 may select the corresponding instant application 152 as the account application 151. In some embodiments, if the application server 150 selects an instant application 152 as the account application 151, the application server 150 may cause the mobile device 110 to open an application store application (e.g., one of the other applications 116) to download the instant application 152. Examples of application stores include the Google® Play store, the Apple® App Store, the Amazon® Appstore, etc.

In some embodiments, when the OS 112 receives the URL with encrypted data 108, the URL is directed to an instant application 152. In some such embodiments, the instant application 152 is downloaded through an application store. Therefore, instead of opening the web browser 115, the OS 112 opens the corresponding application store application 116. In some embodiments, the application store application 116 is opened in the background of the OS 112 without opening the application store application 116 in the foreground of the OS 112. In such embodiments, the instant application 152 is downloaded in the background of the OS 112. Regardless of whether occurring in the foreground or the background of the OS 112, the application store application 116 downloads, installs, and executes the instant application 152. However, in some embodiments, such instant applications 152 may be downloaded using the web browser 115, regardless of where the instant applications 152 are stored.

In addition and/or alternatively, the application server 150 may select the account application 151 based on the portions of an application required to perform a given function. For example, the application server 151 may determine, based on the encrypted data 105 in the URL with encrypted data 108, that the functions include one or more of extracting the encrypted data 105, decoding the encrypted data 105, transmitting the decoded encrypted data 105 to the authentication server 120, receiving the virtual card data 126 from the VAN generator 142, and providing the virtual card data 126 to the autofill service 114. Therefore, the application server 150 may select one or more account applications 151 that include functionality required to perform the stated functions. For example, the application server 150 may select one or more instant applications 152 that include functionality to extract the encrypted data 105, decode the encrypted data 105, transmit the decoded encrypted data 105 to the authentication server 120, receive the virtual card data 126 from the VAN generator 142, and provide the virtual card data 126 to the autofill service 114. In some embodiments, the application server 150 may transmit additional portions of the application to the mobile device 110 (e.g., as part of a background download).

Similarly, the application server 150 may select one or more progressive web applications 153 based on the portions of an application required to perform a given function. For example, the progressive web applications 153 may be optimized for a given task and/or function. As another example, the progressive web applications 153 may include a subset of a core progressive web application 153 that perform the required functions (and/or additional functions). The core progressive web application 153 may include the complete functionality of the account management application. Therefore, continuing with the previous example, the application server 150 may select one or more progressive web applications 153 that are optimized to extract the encrypted data 105, decode the encrypted data 105, transmit the decoded encrypted data 105 to the authentication server 120, receive the virtual card data 126 from the VAN generator 142, and provide the virtual card data 126 to the autofill service 114. Similarly, the application server 150 may select the subset of the core progressive web application 153, where the subset includes functionality to extract the encrypted data 105, decode the encrypted data 105, transmit the decoded encrypted data 105 to the authentication server 120, receive the virtual card data 126 from the VAN generator 142, and provide the virtual card data 126 to the autofill service 114.

Figure 1B:
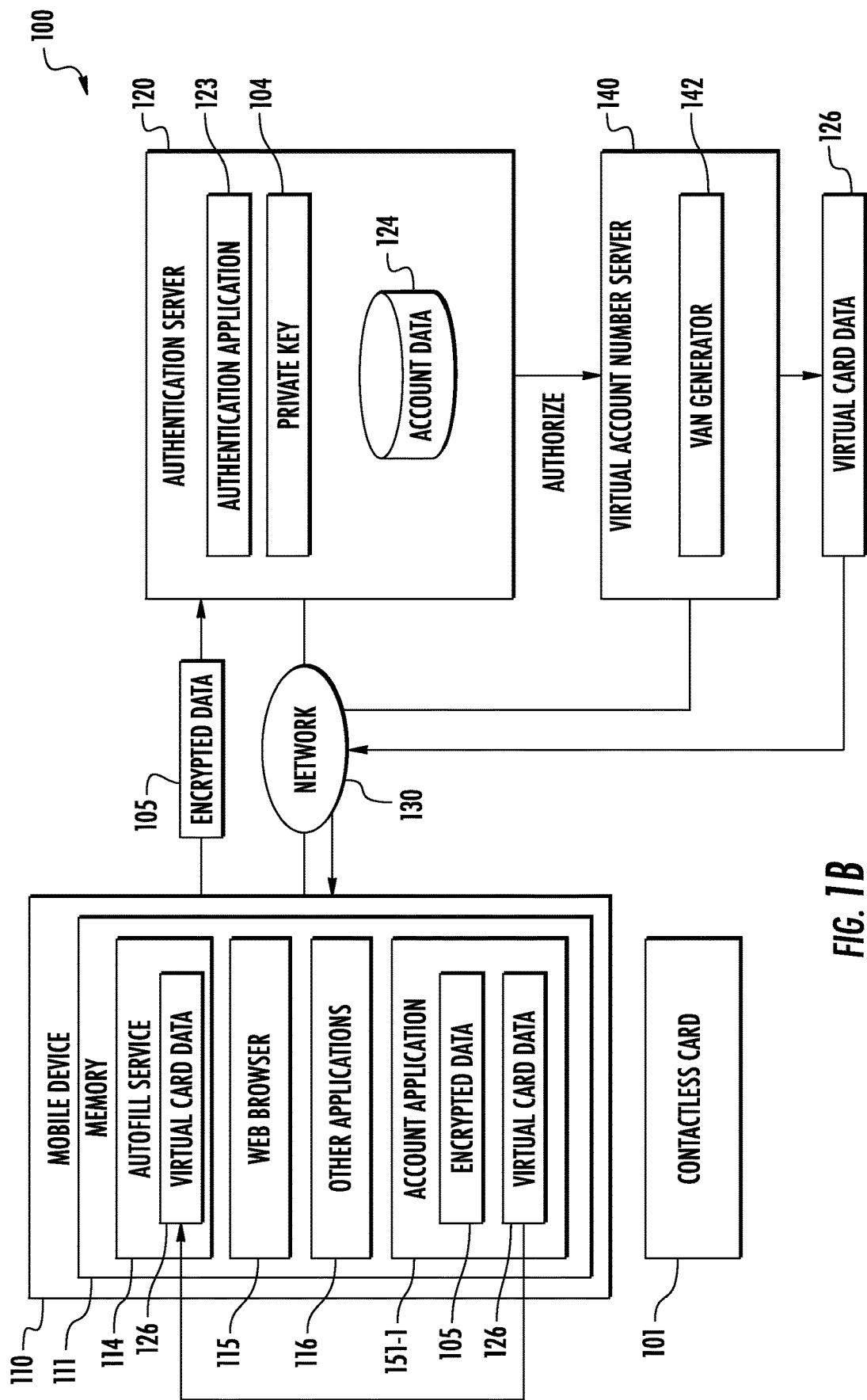

FIG. 1B depicts an embodiment where an example account application 151-1 has been dynamically downloaded and installed in the memory 111 of the mobile device 110. The account application 151 may be an instant application 152 and/or a progressive web application 153. In FIG. 1B, some elements of FIG. 1A are not depicted for the sake of clarity. As stated, the account application 151-1 may be selected by the application server 150 based on one or more required functions, the functions performed by the account application 151-1, and/or the parameters of the mobile device 110. Although depicted as executing in the memory 111 (e.g., as an instant application 152), if the account application 151-1 is a progressive web application 153, the progressive web application 153 instance of the account application 151-1 may execute in the web browser 115. In one embodiment where the account application 151-1 is a progressive web application 153, the progressive web application 153 may determine to download and install an instant application 152 from the application server 150 on the mobile device 110.

Furthermore, regardless of whether the account application 151-1 is an instant application 152 or a progressive web application 153, the account application 151-1 includes pages or functionality sufficient perform the required functionality (e.g., the functionality described herein). More specifically, once downloaded to the mobile device 110, the account application 151-1 may open one or more pages (e.g., pages specified by one or more parameters of the URL 106) that receive the URL with encrypted data 108 as input, extract the encrypted data 105 from the URL with encrypted data 108, and transmit the encrypted data 105 to the authentication server 120 via the network 130. Furthermore, the account application 151-1 may convert the encrypted data 105 to the original encoding format (e.g., from ASCII base64 to binary) prior to transmitting the binary encrypted data 105 to the authentication server 120. As described in greater detail below, the account application 151-1 may receive virtual card data 126 from the VAN generator 142 and provide the virtual card data 126 to the autofill service 114.

Once received, the authentication application 123 may then authenticate the encrypted data 105. For example, the authentication application 123 may attempt to decrypt the encrypted data 105 using a copy of the private key 104 stored in the memory 122 of the authentication server 120. The private key 104 may be identical to the private key 104 stored in the memory 102 of the contactless card 101, where each contactless card 101 is manufactured to include a unique private key 104 (and the authentication server 120 stores a corresponding copy of each unique private key 104). Therefore, the authentication application 123 may successfully decrypt the encrypted data 105, thereby verifying the encrypted data 105. For example, as stated, a customer identifier may be used to generate the encrypted data 105. In such an example, the authentication application 123 may decrypt the encrypted data 105 using the private key 104 of the authentication server 120. If the result of the decryption yields the customer identifier associated with the account in the account data 124, the authentication application 123 verifies the encrypted data 105, and instructs the VAN generator 142 to generate virtual card data 126 for the account associated with the contactless card 101. If the authentication application 123 is unable to decrypt the encrypted data to yield the expected result (e.g., the customer identifier of the account associated with the contactless card 101), the authentication application 123 does not validate the encrypted data 105. Due to the failed verification, the authentication application 123 does not instruct the VAN generator 142 to generate virtual card data 126 to preserve the security of the associated account.

The embodiment depicted in FIG. 1B reflects where the authentication application 123 validates the encrypted data 105 and instructs the virtual account number (VAN) generator 142 in the memory 141 of the virtual account number server 140 to generate virtual card data 126. The virtual card data 126 may comprise a virtual account number, expiration date, and/or CVV for the account associated with the contactless card 101. In some embodiments, the VAN generator 142 generates the virtual account number, the expiration date, and the CVV. In other embodiments, the VAN generator 142 generates the virtual account number and selects an existing expiration date and/or CVV (e.g., from the account data 124). For example, the existing expiration date and/or CVV may be the expiration date and/or CVV of the contactless card 101, or another card associated with the account in the account data 124. The card data 126 may further include the name of the account holder and one or more known addresses associated with the contactless card 101.

In at least one embodiment, the card data 126 including the virtual account number generated by the VAN generator 142 is restricted to a specific merchant or group of merchants. The virtual account number and/or card data 126 may further include other restrictions (e.g., time restrictions, amount restrictions, etc.). Once generated, the VAN generator 142 may transmit the virtual card data 126 to the account application 151-1 executing on the mobile device 110. The VAN generator 142 may provide the virtual card data 126 to the account application 151-1 via any suitable method, such as a push notification, text message, email, one or more data packets, etc.

Once received by the account application 151-1, the account application 151-1 may provide the virtual account number, the expiration date, CVV, address of the virtual card data 126 to the autofill service 114 of the OS 112, e.g., via an application programming interface (API) of the autofill service 114. Therefore, the account application 151-1 further includes functionality to receive the virtual card data 126 and provide the virtual card data 126 to the autofill service 114. As illustrated in FIG. 1B, the autofill service 114 now stores the virtual card data 126, including a virtual account number, expiration date, and CVV. As stated, the virtual card data 126 may further include an account holder name, billing address, and/or shipping address. Doing so allows the autofill service 114 to inject the virtual card data 126 into the forms 127, 129 of the web browser 115 and other applications 116, respectively.

Figure 1C:
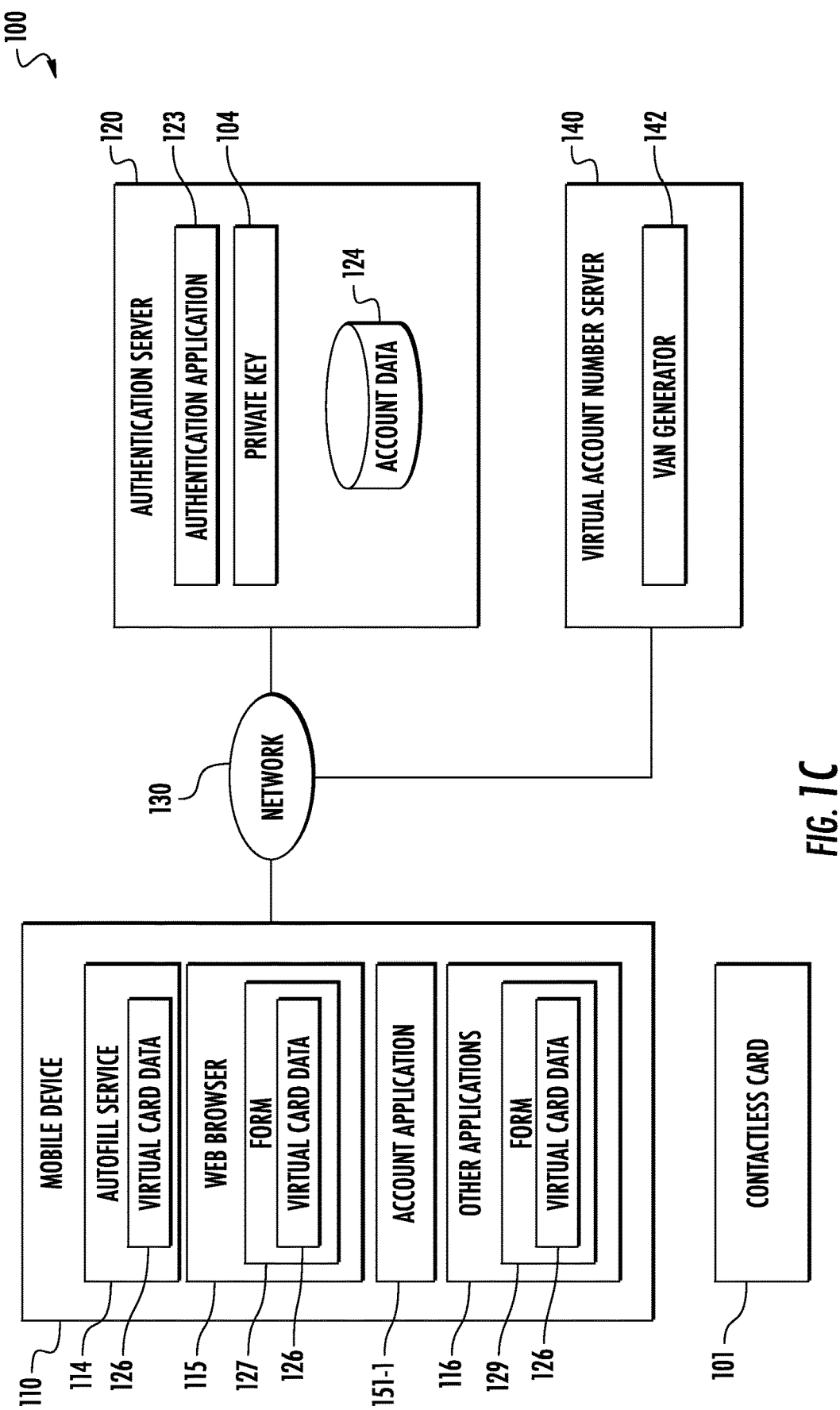

FIG. 1C depicts an embodiment where the autofill service 114 automatically fills the virtual card data 126 to the form 127 in the web browser 115 and the form 129 of the other applications 116. As described in greater detail with reference to FIGS. 2A-2D, the autofill service 114 may autofill each element of the virtual card data 126 to a corresponding field of the forms 127, 129. In at least one embodiment, a user may be prompted to approve the autofill of the virtual card data 126 to the forms 127, 129.

Figure 2B:
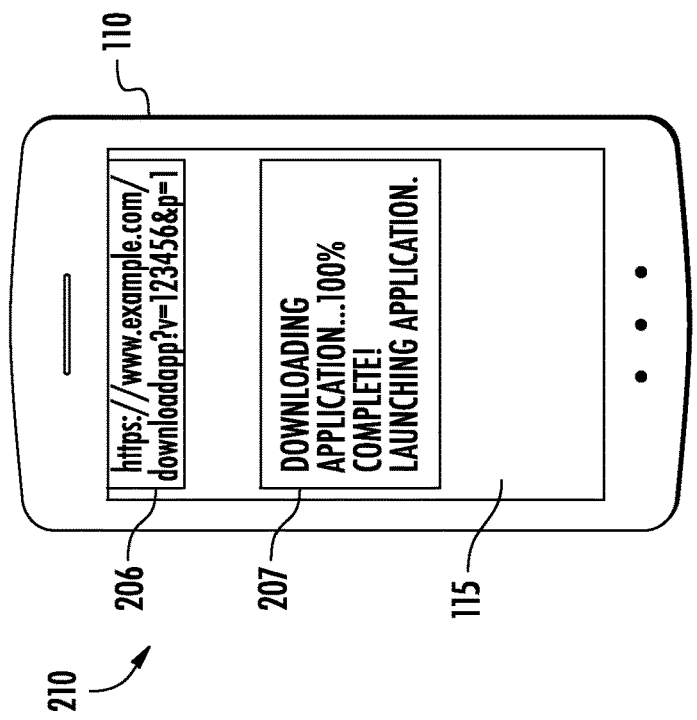
FIGS. 2A-2D illustrate embodiments of tapping a contactless card to a computing device to securely generate virtual card numbers which can be autofilled in form fields.
Figure 2A:
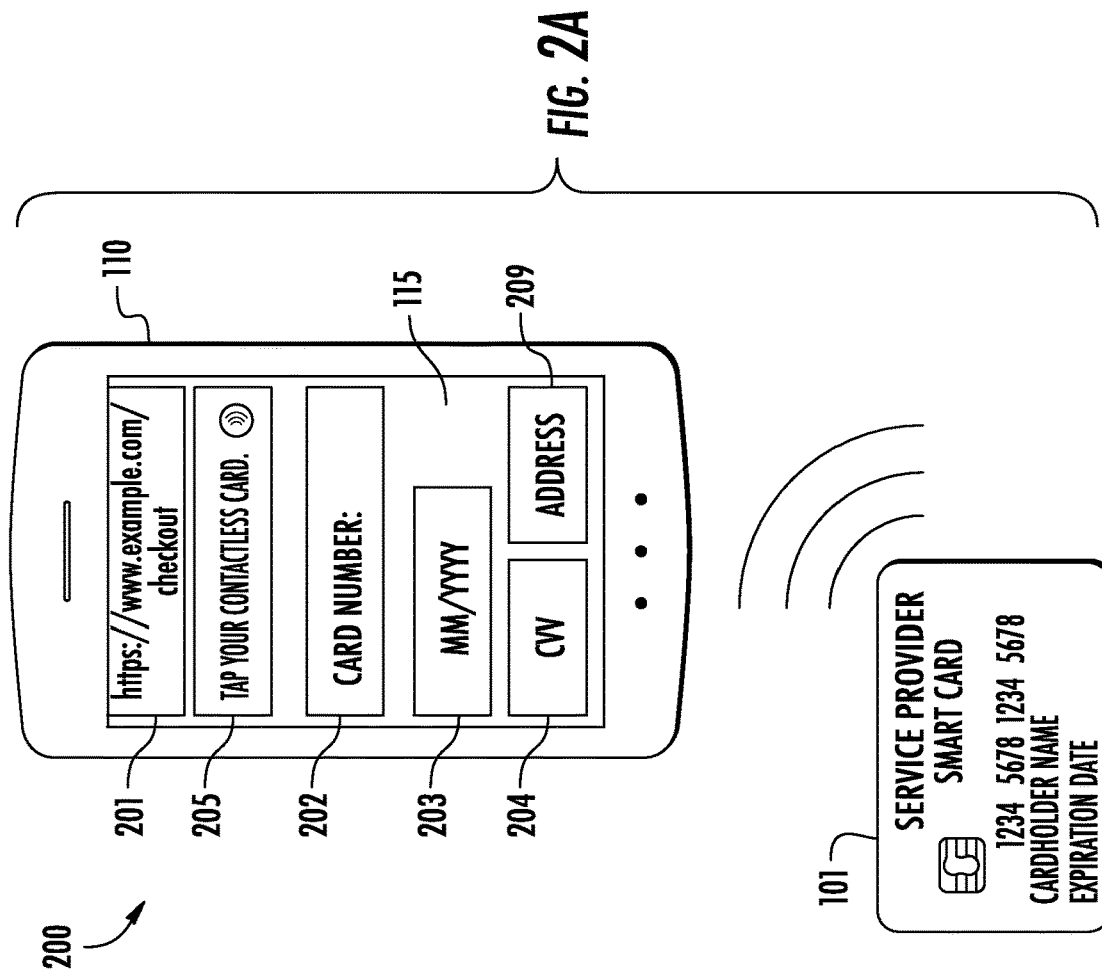

FIG. 2A is a schematic 200 depicting an example embodiment of tapping the contactless card 101 to generate virtual card data to fill into an example form using the autofill service 114. As shown, the web browser 115 outputs a page at a URL 201. The page at the URL 201 includes a form with form fields 202-204 and 209 (e.g., a payment form), where field 202 corresponds to an account number field, field 203 corresponds to an expiration date field, field 204 corresponds to a CVV field, and field 209 corresponds to an address field. The address field 209 may be a billing address and/or a shipping address. The form may include additional elements not depicted for the sake of clarity. As shown, a notification 205 is outputted by the OS 112 and/or a different service (if installed). The notification 205 instructs the user to tap the contactless card 101 to the mobile device 110. In one embodiment, the user selects the notification 205 prior to tapping the contactless card 101 to the mobile device 110. However, in some embodiments, the notification 205 is not outputted, and the user taps the contactless card 101 to the mobile device 110 without instructions from the notification 205.

In one example, the OS 112 outputs the notification 205 when the account number field 202 (or another field) receives focus (e.g., is selected by the user). To determine that a field has received focus, the OS 112 may analyze a hypertext markup language (HTML) attribute of the account number field 202 to determine that the account number field 202 has received focus. As another example, the OS 112 outputs the notification 205 upon determining that the form includes one or more payment fields. Furthermore, the OS 112 may analyze the metadata of the account number field 202 to determine that the field 202 is associated with the account number. For example, the OS 112 may determine, based on the metadata, that the account number field 202 is configured to receive 16 characters as input. As another example, the metadata may specify a name for the form field 202 that is similar to names associated with account number fields (e.g., "accountnumber", "account number", etc.). As another example, the metadata of a form field may specify that the form field is associated with the account number field, expiration date field, CVV field, shipping address field, and/or billing address field. Therefore, the OS 112 may output the notification 205 to tap the contactless card 101 to the mobile device 110 based on automatically determining that the form includes one or more payment fields and/or based on determining that the payment field has received focus.

As stated, once the contactless card 101 is tapped to the mobile device 110, the OS 112 transmits, via the card reader 119 (e.g., via NFC, Bluetooth, RFID, and/or the EMV protocol, etc.), an indication to the communications interface 107 of the contactless card 101. The indication may specify to generate a URL with encrypted data. As stated, the applet 103 may generate the encrypted data using data (e.g., a customer identifier) and the private key 104 of the contactless card as input to a cryptographic algorithm to generate encrypted data 105. The applet 103 may encode the encrypted data 105 into an encoding format compatible with URLs. The applet 103 may then select a URL 106 and include the encoded encrypted data 105 as a parameter of the URL 106. The applet 103 may further add indications of one or more pages of the account application 151 as parameters to the URL. Doing so ensures that the account application 151 opens to the correct page upon execution by receiving the URL as input (e.g., as "oncreate" input provided to the account application 151 upon execution). The applet 103 may then transmit the URL with encrypted data to the mobile device 110 via the communications interface 107.

FIG. 2B is a schematic 210 depicting an embodiment where the OS 112 of the mobile device 110 receives the URL with encrypted data generated by the contactless card 101. As shown, the OS 112 has caused the web browser 115 to open an example URL 206 that is directed to the application server 150. In embodiments, where the payment form fields 202-204 are in one of the other applications 116, the OS 112 opens the web browser 115 and causes the web browser 115 to access the URL 206. The application server 150 may then receive the request and initiate transmission of the account application 151 associated with the URL 206. As stated, the account application 151 may be an instant application 152, a progressive web application 153, or any other application that is not pre-installed on the mobile device 110. Generally, the application server 150 selects the account application 151 based on the required functionality and the functionality performed by the account application 151. In some embodiments, the application server 150 selects the account application 151 based on attributes describing the mobile device 110 received with the URL 206. For example, if the OS 112 of the mobile device 110 does not support instant applications 152 but supports progressive web applications 153, the application server 150 may transmit an account application 151 that is a progressive web application 153 to the mobile device 110. Other example attributes describing the mobile device 110 include detected versions of software installed in the OS 112, the speed of a network connection of the mobile device 110, remaining battery life of the mobile device 110, etc. Therefore, for example, if the mobile device 110 has a slow network connection and/or little remaining battery life, the application server 150 may select the account application 151 having the smallest size that can perform the required functions.

Figure 2D:
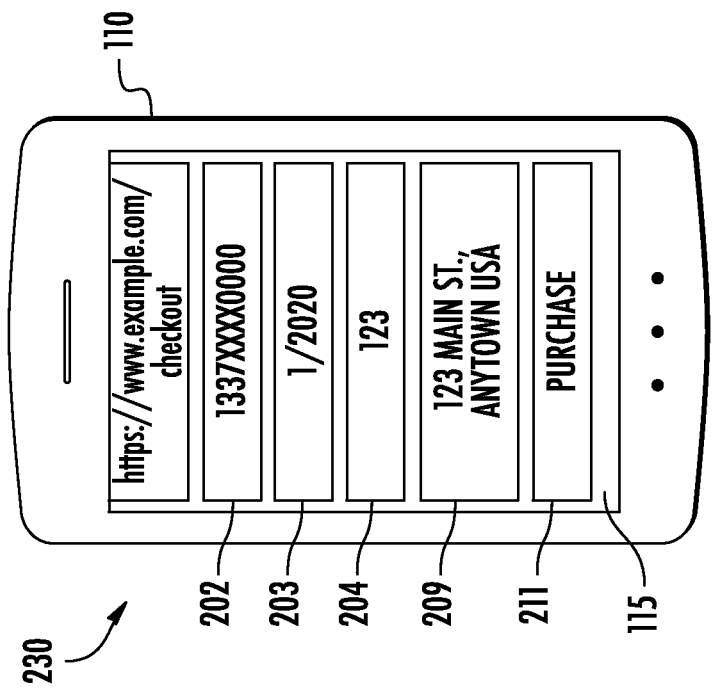
Figure 2C:
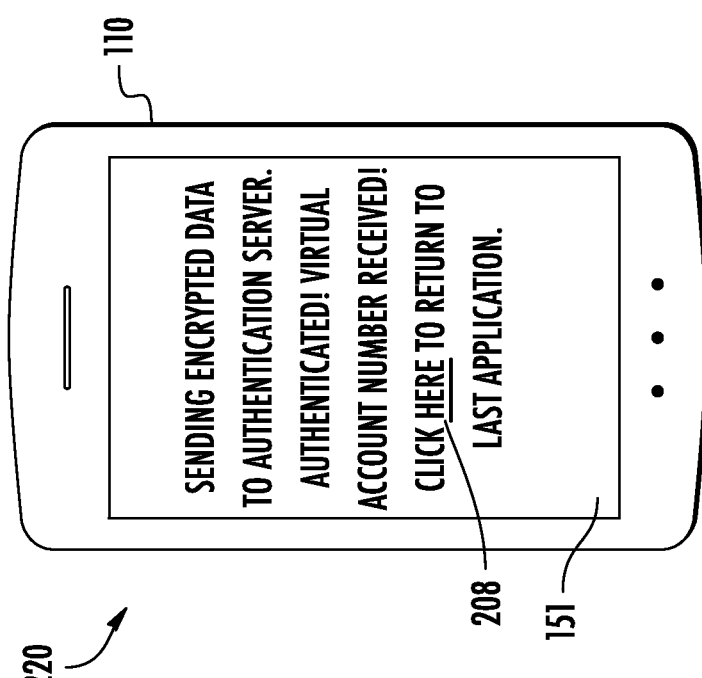

FIG. 2C is a schematic 220 depicting an embodiment where an instant application 152 version of the account application 151 is downloaded and installed on the mobile device 110. As shown, the account application 151 opens a page reflecting that the encrypted data 105 has been extracted and decoded from the URL 206. The page of the account application 151 is opened based on the parameter "p=1" in the URL 206. The account application 151 may then transmit the extracted and decoded encrypted data 105 to the authentication server 120 for authentication. As shown, the authentication server 120 authenticates the encrypted data 105 and instructs the VAN generator 142 to generate a virtual card number, expiration date, and CVV. The VAN generator 142 then transmits the generated data to the account application 151, which outputs a URL 208 that redirects to the previous application (e.g., the web browser 115 and/or the other applications 116) with the payment form. Other graphical objects may be used instead of the link 208, and the use of the link 208 should not be considered limiting of the disclosure.

FIG. 2D is a schematic 230 depicting an embodiment where the user has selected the link 208 in the account application 151 to return to the web browser 115. As shown, the autofill service 114 has autofilled example data to the form fields 202-204 in the web browser 115. More specifically, the autofill service 114 has autofilled a virtual account number to the form field 202, an expiration date to the form field 203, a CVV to form field 204, and the account holder's address to form field 209. Once autofilled, the user may select the purchase button 211 to process the payment for a purchase. Advantageously, the data is autofilled to the form fields without requiring the user to manually enter the data and without requiring a dedicated application to autofill the data to be pre-installed on the device 110. In some embodiments, the autofill service 114 may output a notification to the user (not pictured) that must be selected prior to autofilling the data to the form fields 202-204 and 209.

In some embodiments, the autofill service 114 detects a form field (e.g., the form fields 202-204, 209), detects content in a notification (e.g., a text message notification) that has a type which matches the type of the detected form field, and offers the content parsed from the notification into an autofill suggestion in the keyboard. Doing so allows the autofill service 114 to automatically fill the data from the notification to the corresponding form fields.

Figure 3:
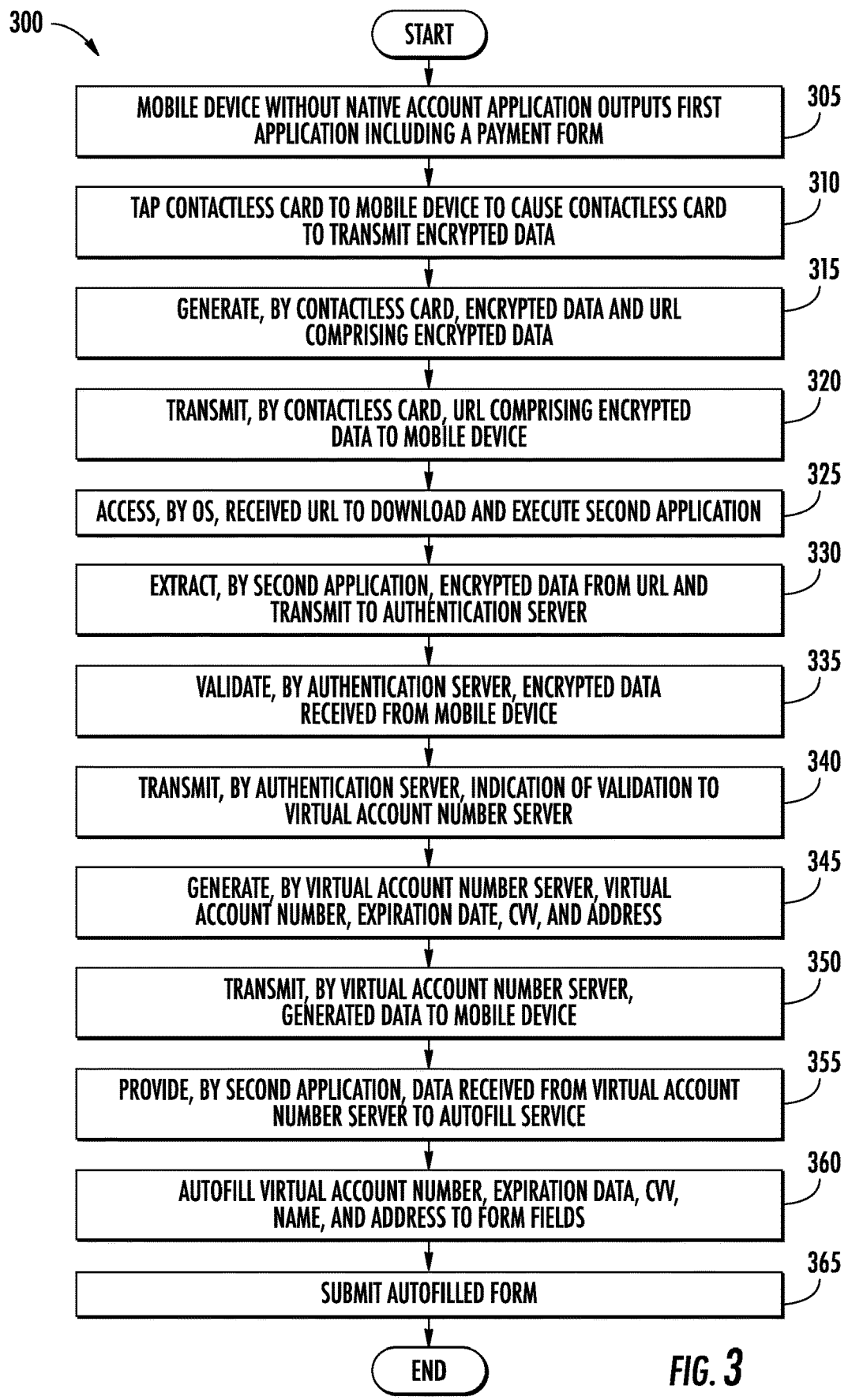
FIG. 3 illustrates an embodiment of a first logic flow.

FIG. 3 illustrates an embodiment of a logic flow 300. The logic flow 300 may be representative of some or all of the operations executed by one or more embodiments described herein. For example, the logic flow 300 may include some or all of the operations to use a contactless card to generate a virtual card data and autofill the virtual account number to a form using the autofill service 114. Embodiments are not limited in this context.

As shown, the logic flow 300 begins at block 305, where a mobile device 110 that does not include an installed account management application outputs a first application that includes a payment form with payment fields. The first application may be the web browser 115 including a form 127 and/or one of the other applications 116 including a form 129. The payment fields may include one or more of an account number field, expiration date field, a CVV field, one or more name fields, and one or more address fields (e.g., billing address, shipping address, etc.). For example, the OS 112 may analyze the metadata of the form fields to determine that one or more of the fields is associated with an account number, expiration date, CVV, billing address, etc. As another example, the OS 112 may determine, based on the metadata, that a field is configured to receive 16 characters as input.

In some embodiments, a user may tap the payment field of a form in the web browser 115 to give one of the payment fields focus. For example, a user may tap the payment field of the form to give the payment field focus. As another example, the user may select the payment field of the form using a mouse and/or keyboard. More generally, any technique may be used to give the payment field focus, including programmatically generated focus. For example, the payment field may receive focus based on the HTML "focus( )" method. As another example, the payment field may automatically receive focus when the form is loaded, e.g., based on the "autofocus" HTML attribute being applied to the payment field in source code. Once the payment field receives focus, the account application 113 and/or the OS 112 may output a notification specifying to the user to tap the contactless card 101 to the mobile device 110.

At block 310, a user taps the contactless card 101 to the mobile device 110 to cause the contactless card 101 to generate and transmit encrypted data as part of a URL to the application server 150 and/or one of the account applications 151. The OS 112 may transmit an indication to the contactless card 101 via the NFC card reader 119 specifying to generate and transmit encrypted data as part of the URL.

At block 315, the applet 103 of the contactless card generates the encrypted data using the private key 104, input data (e.g., a customer identifier), and a cryptographic algorithm. The applet 103 may then include the encrypted data as a parameter of a URL. The applet 103 may further encode the encrypted data prior to appending the encoded encrypted data as a parameter of the URL. Furthermore, the URL may be a universal link URL which has a parameter specifying an identifier of one or more pages of the account application 151 to be opened when downloaded. Further still, the URL may identify a portion of the instant application 152 and/or progressive web application 153 that needs to be downloaded first. Doing so allows the identified pages to be opened when the application 151 is downloaded to be downloaded first, while other pages that are not immediately opened are downloaded later.

At block 320, the applet 103 may transmit the URL including the encrypted data to the mobile device 110. At block 325, the OS 112 directs the web browser 115 to access the URL received from the contactless card 101 to dynamically download and install (and/or execute) a second application (e.g., one of the account applications 151), where the second application is an instant application 152 and/or a progressive web application 153. The application server 150 may then select and transmit one or more of the account applications 151 to the mobile device 110. As stated, in accessing the URL received from the contactless card 101, the web browser 115 may transmit information describing the mobile device 110 (e.g., an indication of the type of web browser 115, a version of the web browser, a type of the OS 112, and a version of the OS 112, etc.). Therefore, the application server 150 may select the account application 151 based on the types of applications supported by the mobile device 110. Further still, the application server 150 may select the account application 151 based on the types of functions that the account applications 151 must be configured to perform. Once received, the OS 112 executes the received account application 151. For example, the OS 112 may load the progressive web application 153 in the web browser 115. As another example, the OS 112 may execute the instant application. Regardless of the type of the account application 151, the OS 112 receives the URL with encrypted data from the application server 150 and provides the URL with encrypted data to the application as input.

At block 330, the account application 151 extracts the encrypted data from the URL and transmits the encrypted data to the authentication application 123 of the authentication server 120 for verification. As stated, in some embodiments, the account application 151 may decode the encrypted data before transmitting the encrypted data to the authentication server 120. At block 335, the authentication application 123 decrypts the encrypted data using the private key in the memory of the authentication server 120 to validate the encrypted data. At block 340, the authentication application 123 transmits an indication to the VAN generator 142 specifying to generate card data comprising a virtual account number, expiration date, and CVV. At block 345, the VAN generator 142 generates the virtual account number, expiration date, and CVV. At block 350, the VAN generator 142 transmits the virtual account number, expiration date, and CVV to the mobile device 110. The VAN generator 142 may further include the name, billing address, and shipping address of the account holder, which may be stored locally by the VAN generator 142 and/or received from the authentication server 120.

At block 355, the second application (e.g., the downloaded account application 151) provides the received data to the autofill service 114 of the OS 112. Furthermore, the user may return to the first application (e.g., the web browser 115 and/or other application 116). At block 360, The autofill service may then autofill the virtual account number, expiration date, CVV, name, and addresses stored in the autofill service 114 to the payment fields of the form. At block 365, the user submits the autofilled form including the card data generated by the VAN generator 142. For example, the submission of the form may update payment information (e.g., in the user's account), complete a purchase, etc. Advantageously, the form is autofilled and the purchase may be completed without requiring an account management application (or other application that communicates with the contactless card 101 and/or the authentication server 120) to be pre-installed on the device.

Figure 4:
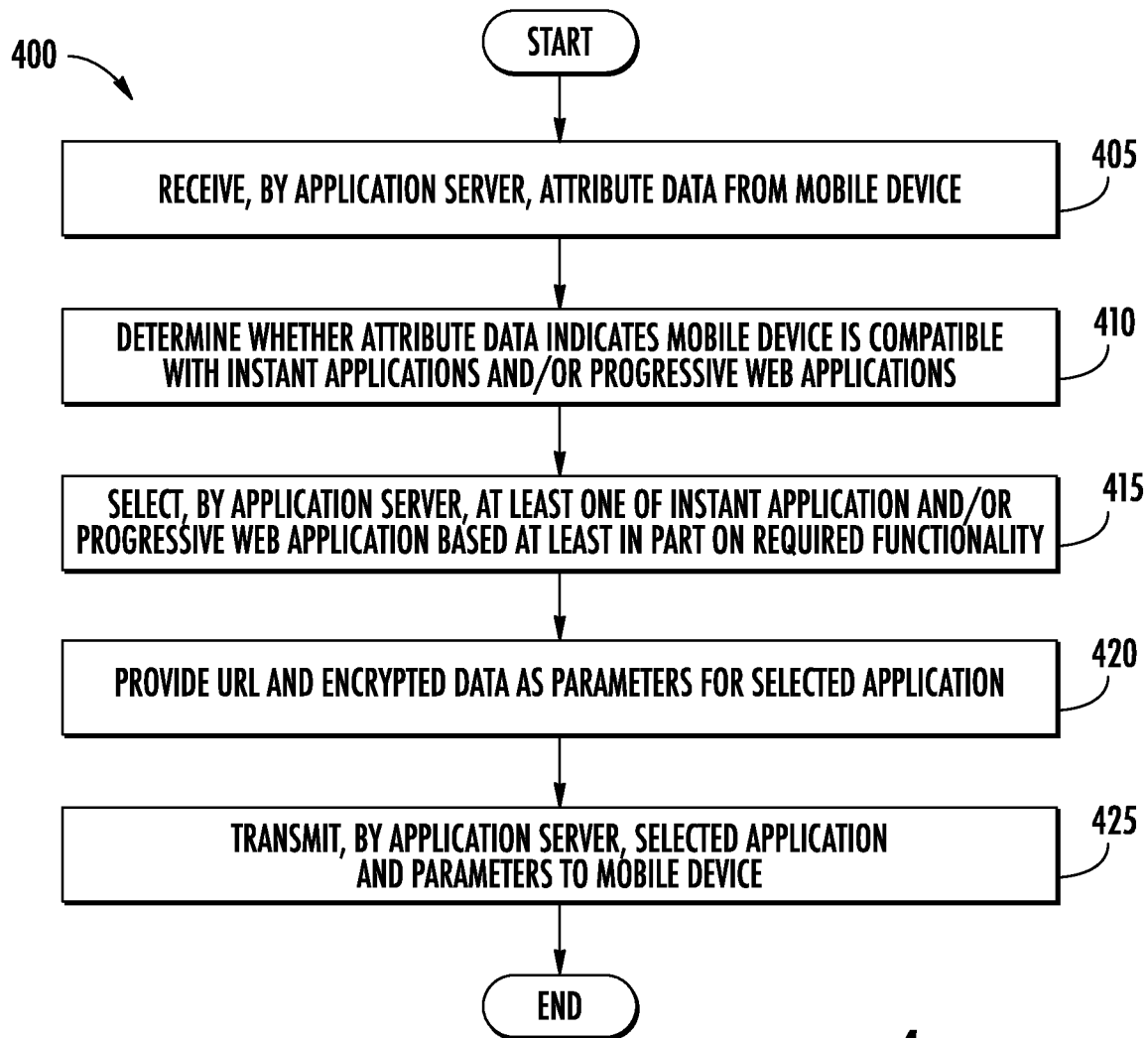
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 500 may include some or all of the operations performed by the application server 150 to select an account application 151 to transmit to the mobile device 110. Embodiments are not limited in this context.

As shown, the logic flow 400 begins at block 405, where the application server 150 receives attribute data from the mobile device 110. Generally, when following the URL generated by the contactless card 101, the web browser 115 includes data describing the mobile device 110 in a hypertext transfer protocol (HTTP) request. The application server 150 may analyze the received data to determine, e.g., the type of mobile device 110, type and/or version of the OS 112, type and/or version of the web browser 115, etc. At block 10, the application server 150 determines, based on the attribute data of the mobile device 110, whether the mobile device 110 is compatible with instant applications 152 and/or progressive web applications 153. For example, instant applications 152 may require a specific type and version of OS for compatibility, while progressive web applications 153 may require a specific type and version of OS and web browser for compatibility. The device attributes indicate whether the mobile device 110 meets these requirements.

At block 415, the application server 150 selects one or more of the instant applications 152 and/or progressive web applications 153 based on the determinations made at block 410. For example, if the mobile device 110 is compatible with instant applications, the application server 150 may select an instant application 152 as the account application 151. Furthermore, as stated, the application server 150 selects one or more of the instant applications 152 and/or progressive web applications 153 based on the required functionality to be performed on the mobile device 110 (e.g., extracting encrypted data, transmitting encrypted data to the authentication server, receiving virtual card data from the VAN generator 142, and providing the received virtual card data to the autofill service 114). At block 420, the application server 150 provides the URL generated by the contactless card 101 as parameters for the download of the account application 151 selected at block 415. At block 425, the application server 150 transmits the selected account application 151 and the URL to the mobile device 110. Doing so causes the selected application to be dynamically downloaded and installed on the mobile device 110.

Figure 5:
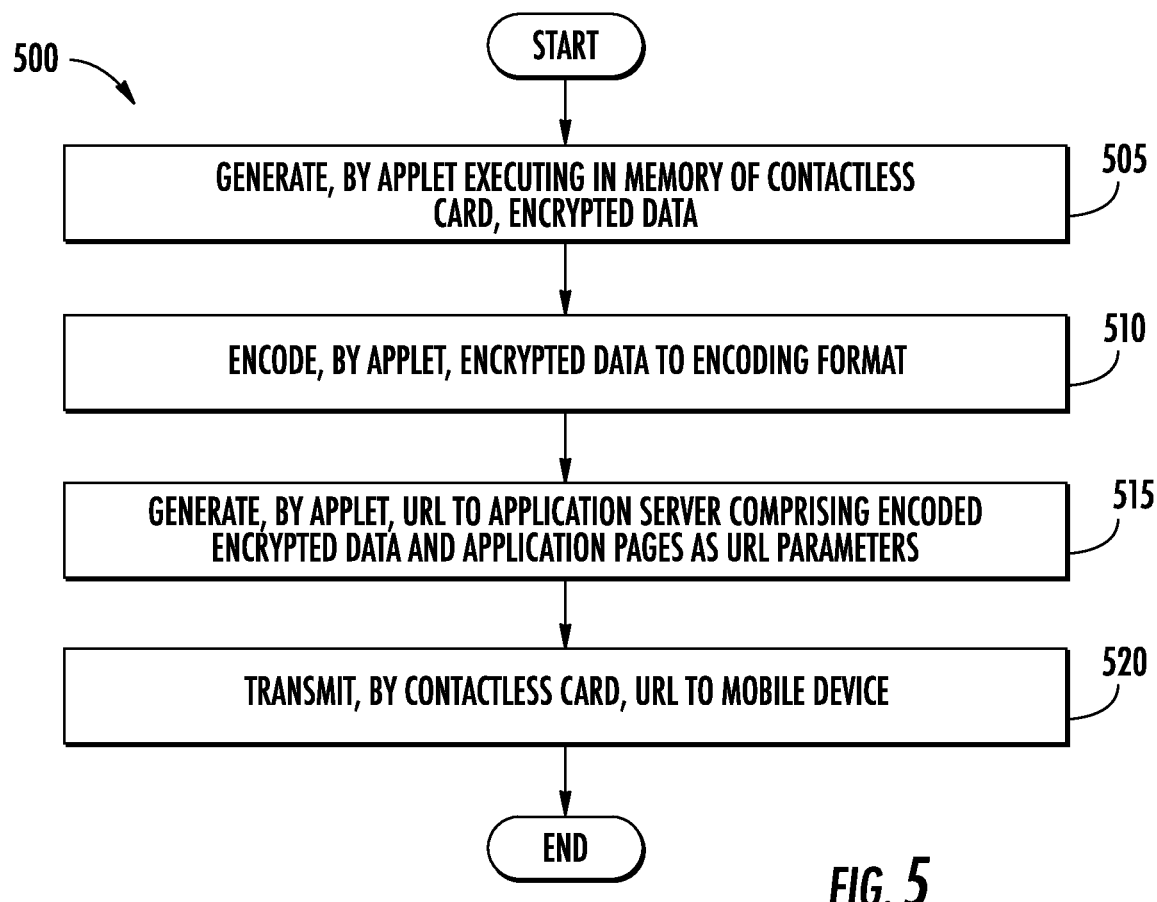
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations performed by the contactless card 101 to generate a URL with encrypted data 108. Embodiments are not limited in this context.

As shown, the logic flow 500 begins at block 505, where the applet 103 of the contactless card generates the encrypted data 105. As stated, the encrypted data 105 is the output of a cryptographic algorithm based on the private key 104 and input data (e.g., a customer identifier). At block 510, the applet 103 encodes the encrypted data 105 according to an encoding format (e.g., ASCII base64). At block 515, the applet 103 generates a URL comprising the encoded encrypted data and one or more application pages of the target account application 151 as parameters. The URL may be directed to the application server 150 and/or one or more of the account applications 151. At block 520, the contactless card 101 transmits the URL generated at block 515 to the mobile device 110. Upon receiving the URL, the OS 112 causes the web browser 115 to access the URL. Doing so may cause an account application 151 to be dynamically downloaded and installed on the mobile device 110.

Figure 6:
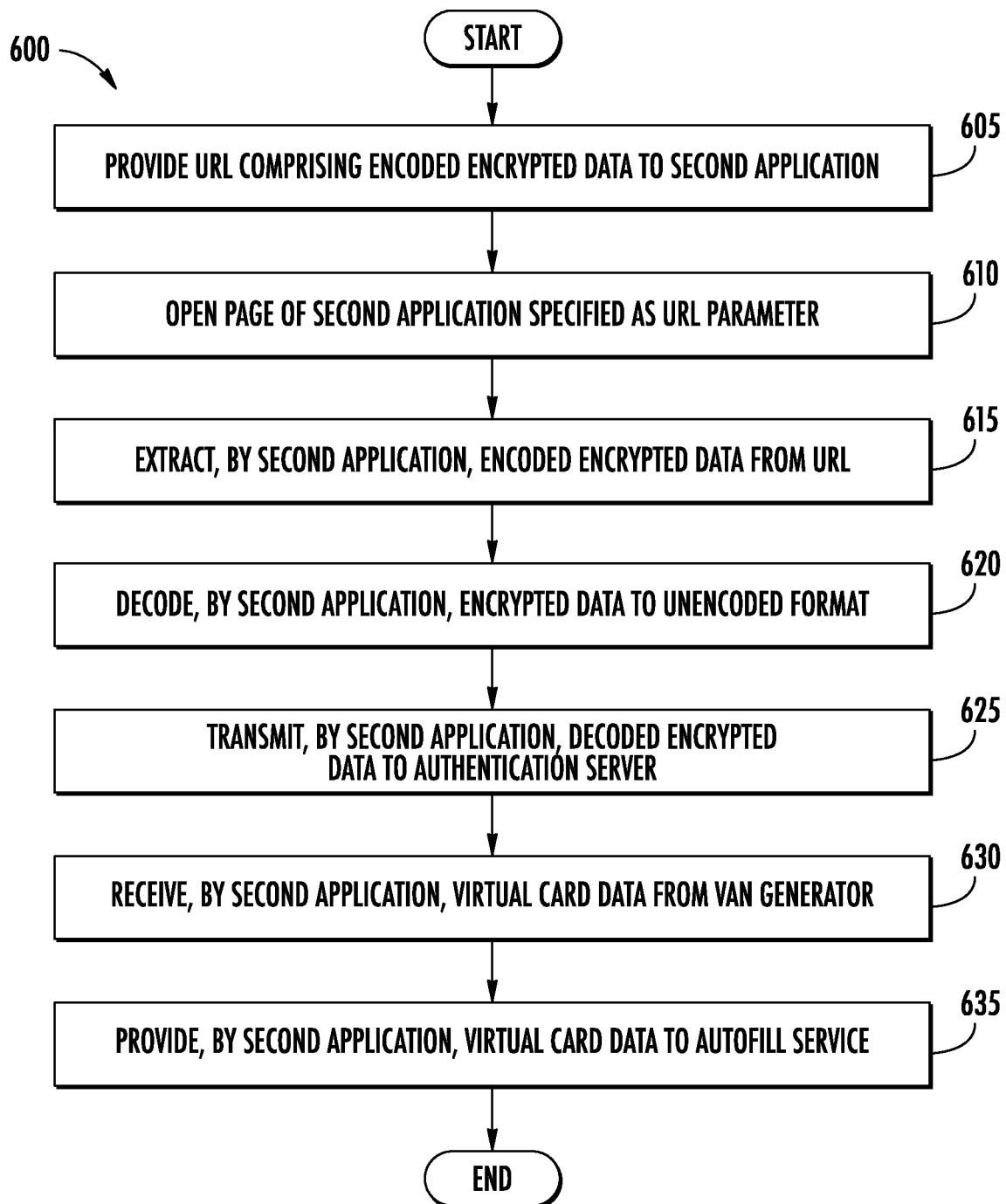
FIG. 6 illustrates an embodiment of a fourth logic flow.

FIG. 6 illustrates an embodiment of a logic flow 600. The logic flow 600 may be representative of some or all of the operations executed by one or more embodiments described herein. For example, the logic flow 600 may include some or all of the operations performed by the account application 151 executing on the mobile device 110. Embodiments are not limited in this context.

As shown, the logic flow 600 begins at block 605, where the second application of FIG. 3 (e.g., the account application 151) receives the URL comprising encoded encrypted data as input. At block 610, the account application 151 opens a page of the account application 151 specified in the URL. For example, the account application 151 may open one or more pages configured to extract the encoded encrypted data from the URL, decode the encrypted data, transmit the encrypted data to the authentication server, receive the virtual card data from the VAN generator 142, and provide the received virtual card data to the autofill service 114. As stated, the account application 151 may be an instant application 152 and/or a progressive web application 153.

At block 615, account application 151 extracts the encoded encrypted data from the URL, e.g., based on a parameter name in the URL. At block 620, account application 151 decodes the encrypted data to an unencoded format (e.g., binary). At block 625, the account application 151 transmits the decoded encrypted data to the authentication server 120. At block 630, the account application 151 receives virtual card data (e.g., one or more of a virtual card number, expiration date, CVV, name, billing address, and shipping address) from the VAN generator 142. At block 635, the account application 151 provides the virtual card data to the autofill service 114.

Figure 7:
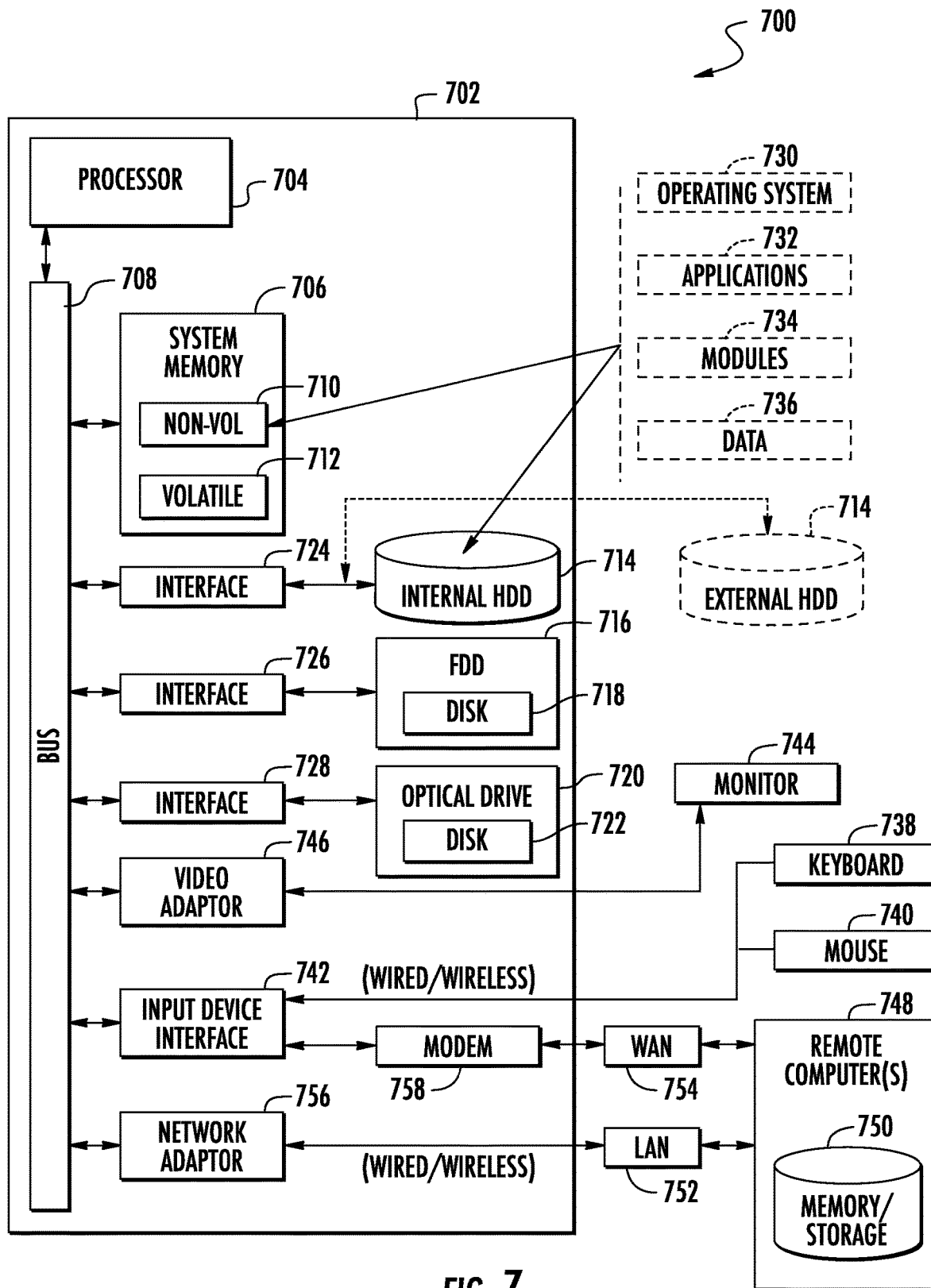
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the system 100. In some embodiments, computing system 702 may be representative, for example, of the mobile devices 110, authentication server 120, the virtual account number server 140, and/or the application server 150 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100, e.g., the applet 103, private keys 104, URL 106, URL with encrypted data 108, operating system 112, autofill service 114, web browser 115, the other applications 116, the authentication application 123 and the VAN generator 142.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method, comprising:
receiving, by a device, a link and encrypted data;
downloading, by the device, an application from an application server based on the link;
executing, by the device, the application;
transmitting, by the application, the encrypted data to a server;
receiving, by the application from the server, an account number of a contactless card;
providing, by the application, the account number to an autofill service; and
autofilling, by the autofill service, the account number to an account number field of a form.

2. The method of claim 1, further comprising:
storing, by the application, the account number in a memory of the device.

3. The method of claim 1, further comprising:
submitting the form comprising the account number in the account number field.

4. The method of claim 1, wherein the account number is a virtual account number.

5. The method of claim 1, wherein the device downloads the application from the application server based on a determination that the application is not installed on the device.

6. The method of claim 1, wherein the application is downloaded in one of a foreground or a background of an operating system (OS) executing on the device.

7. The method of claim 1, further comprising:
completing, by the application, an online checkout using the account number.

8. A non-transitory computer-readable storage medium, the computer-readable storage medium including instructions that when executed by a processor of a device, cause the processor to:
receive a link and encrypted data;
download an application from an application server based on the link;
execute the application;
receive, by the application, the encrypted data;
transmit, by the application, the encrypted data to a server;

receive, by the application, an account number of a contactless card;

provide, by the application, the account number to an autofill service; and autofill, by the autofill service, the account number to an account number field of a form.

9. The computer-readable storage medium of claim 8, wherein the instructions further cause the processor to:

store, by the application, the account number in a memory of the device.

10. The computer-readable storage medium of claim 8, wherein the instructions further cause the processor to:

submit the form comprising the account number in the account number field.

11. The computer-readable storage medium of claim 8, wherein the device downloads the application from the application server based on a determination that the application is not installed on the device.

12. The computer-readable storage medium of claim 8, wherein the application is downloaded in one of a foreground or a background of an operating system (OS) executing on the device.

13. The computer-readable storage medium of claim 8, wherein the instructions further cause the processor to:

complete, by the application, an online checkout using the account number.

14. The computer-readable storage medium of claim 8, wherein the account number is a virtual account number.

15. A computing apparatus comprising:

a processor; and a memory storing instructions that, when executed by the processor, cause the processor to:

receive a link and encrypted data;

download an application from an application server based on the link;

execute the application;

receive, by the application, the encrypted data;

transmit, by the application, the encrypted data to a server;

receive, by the application, an account number of a contactless card;

provide, by the application, the account number to an autofill service; and autofill, by the autofill service, the account number to an account number field of a form.

16. The computing apparatus of claim 15, wherein the instructions further cause the processor to:

store, by the application, the account number in the memory.

17. The computing apparatus of claim 15, wherein the instructions further cause the processor to:

submit the form comprising the account number in the account number field.

18. The computing apparatus of claim 15, wherein the application is downloaded from the application server based on a determination that the application is not installed on the apparatus.

19. The computing apparatus of claim 15, wherein the instructions further cause the processor to:

complete, by the application, an online checkout using the account number.

20. The computing apparatus of claim 15, wherein the account number is a virtual account number.

* * * * *